United States Patent
Sato et al.

(10) Patent No.: US 7,084,887 B1
(45) Date of Patent: Aug. 1, 2006

(54) MARKER LAYOUT METHOD, MIXED REALITY APPARATUS, AND MIXED REALITY SPACE IMAGE GENERATION METHOD

(75) Inventors: Kiyohide Sato, Kawasaki (JP); Toshikazu Ohshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/506,382

(22) Filed: Feb. 18, 2000

(30) Foreign Application Priority Data

Jun. 11, 1999 (JP) .......................... 11-164716
Jun. 11, 1999 (JP) .......................... 11-164717

(51) Int. Cl.
*G09G 5/00* (2006.01)
*G06K 9/00* (2006.01)

(52) U.S. Cl. ...................... 345/633; 382/154
(58) Field of Classification Search ................ 345/633, 345/632, 641, 9, 8, 7; 348/116; 702/150–153, 702/94, 95; 463/1, 31, 32, 33; 382/287
See application file for complete search history.

(56) References Cited

U.S. PATENT DOCUMENTS

| | | | | | |
|---|---|---|---|---|---|
| 5,412,569 | A | * | 5/1995 | Corby et al. ............ | 340/853.2 |
| 5,495,576 | A | * | 2/1996 | Ritchey ................... | 345/420 |
| 5,583,526 | A | * | 12/1996 | Socks et al. ............. | 345/7 |
| 5,717,414 | A | * | 2/1998 | Bergsneider et al. ... | 345/158 |
| 5,729,471 | A | * | 3/1998 | Jain et al. ............... | 345/419 |
| 5,742,263 | A | * | 4/1998 | Wang et al. ............. | 345/7 |
| 5,812,257 | A | * | 9/1998 | Teitel et al. ............. | 342/463 |
| 5,815,411 | A | * | 9/1998 | Ellenby et al. .......... | 345/9 |
| 5,831,584 | A | * | 11/1998 | Socks et al. ............. | 345/158 |
| 5,850,352 | A | * | 12/1998 | Moezzi et al. ........... | 345/419 |
| 6,054,991 | A | * | 4/2000 | Crane et al. ............. | 345/420 |
| 6,057,856 | A | * | 5/2000 | Miyashita et al. ....... | 345/633 |
| 6,064,749 | A | * | 5/2000 | Hirota et al. ............ | 345/7 |
| 6,094,625 | A | * | 7/2000 | Ralston ................... | 239/161 |
| 6,148,108 | A | | 11/2000 | Nishikawa | |
| 6,148,280 | A | * | 11/2000 | Kramer .................... | 702/153 |
| 6,157,368 | A | * | 12/2000 | Fager ....................... | 250/221 |
| 6,222,937 | B1 | * | 4/2001 | Cohen et al. ............ | 345/634 |
| 6,308,565 | B1 | * | 10/2001 | French et al. ........... | 73/379.04 |
| 6,330,356 | B1 | * | 12/2001 | Sundareswaran et al. | 382/154 |
| 6,335,731 | B1 | * | 1/2002 | Yamamoto ................ | 345/419 |
| 6,486,877 | B1 | * | 11/2002 | Watanabe ................. | 345/420 |
| 6,522,312 | B1 | * | 2/2003 | Ohshima et al. ......... | 345/8 |
| 6,556,722 | B1 | * | 4/2003 | Russell et al. ........... | 382/291 |
| 6,611,141 | B1 | * | 8/2003 | Schulz et al. ............ | 324/226 |
| 6,724,930 | B1 | * | 4/2004 | Kosaka et al. ........... | 382/154 |

FOREIGN PATENT DOCUMENTS

| | | |
|---|---|---|
| EP | 0 923 235 A1 | 6/1999 |
| JP | 10-210473 | 8/1998 |
| JP | 10-326357 | 12/1998 |
| JP | 11-84307 | 3/1999 |

OTHER PUBLICATIONS

"Vision–Based Object Registration for Real–Time Image Overlay", M. Uenohara et al., Conference on Computer Vision, Virtual Reality and Robotics in Medicine, 1995, pp. 13–22.*

* cited by examiner

*Primary Examiner*—Ryan Yang
(74) *Attorney, Agent, or Firm*—Fitzpatrick, Cella, Harper & Scinto (57) ABSTRACT

There is disclosed a marker layout method in a mixed reality space, which can reliably detect markers in units of players, even when a plurality of players share a common mixed reality space. According to this invention, markers to be used by only a given player are laid out at positions that cannot be seen from other players. Real objects used in an application that uses a mixed reality space may be used.

12 Claims, 10 Drawing Sheets

✦ : MARKER FOR player-A
X : MARKER FOR player-B
○ : MARKER FOR player-C

✧ : MARKER FOR player-A
✕ : MARKER FOR player-B
○ : MARKER FOR player-C

FIG. 5A

MARKERS ARE SEEN FROM VIEWPOINT OF player-A

FIG. 5B

MARKERS ARE SEEN FROM VIEWPOINT OF player-B

FIG. 5C

MARKERS ARE SEEN FROM VIEWPOINT OF player-C

FIG. 6A
MARKERS ARE SEEN WHEN NO OBSTACLES ARE USED

FIG. 6B
MARKERS ARE SEEN WHEN NO OBSTACLES ARE USED

FIG. 6C
MARKERS ARE SEEN WHEN NO OBSTACLES ARE USED

MARKER

FIG. 9B

VIRTUAL OBJECT (TEXTURE) FOR HIDING MARKER

MARKER LAYOUT METHOD, MIXED REALITY APPARATUS, AND MIXED REALITY SPACE IMAGE GENERATION METHOD

FILED OF THE INVENTION

The present invention relates to a method of laying out a marker used as a position index upon presenting a mixed reality space and, more particularly, to a marker layout method which allows easy detection of a marker even when a plurality of players share a mixed reality space, and a mixed reality apparatus using the same.

BACKGROUND OF THE INVENTION

In recent years, Mixed Reality (MR) that aims at seamlessly coupling a real space and virtual space has been extensively studied. MR has received a lot of attention as a technique which aims at realizing coexistence of a virtual reality (VR) world that can be expressed in only a situation isolated from a real space, and the real space, and augments VR.

A typical apparatus for implementing MR is a head-mounted display (HMD). More specifically, MR is implemented by mixing and displaying real and virtual spaces on the HMD. MR schemes using the HMD include an optical see-through scheme for superposing a CG image or the like onto an image displayed on a semi-transparent (see-through) HMD, and a video see-through scheme for mixing a CG image or the like onto image data sensed by a video camera attached to an HMD, and then displaying the mixed image on the HMD.

MR can be used, quite possibly, in new fields which are qualitatively quite different from VR, such as a medical assist application for presenting the state inside the body of a patient to a doctor as if it were seen through, a job assist application for superposing and displaying the assembly sequence of a product on real parts in a factory, and the like.

A technique for removing "deviation" between real and virtual spaces is commonly required for these applications. "Deviation" can be classified into positional deviation, temporal deviation, and qualitative deviation, and many studies have been conventionally made for removal of positional deviation as the most fundamental requirement among those deviations.

Especially, in case of video see-through MR, since an image process scheme can be relatively easily applied as a method of correcting positional deviation, alignment using an image process has been conventionally proposed.

More specifically, a method in which markers which are marked in color so an image process can easily detect are laid out at a predetermined position in a real space, and the viewpoint position is computed on the basis of the marker positions detected from an image sensed by a camera attached to a player, and a method of correcting an output signal from a location/posture sensor based on marker positions in an image, and the like are available.

When markers in image data are detected, and the location/posture of a player is estimated based on the detection result, the markers must appear in an image to have an appropriate size and nearly uniform intervals. Also, since a sufficient number of markers must be simultaneously detected in the image upon computing the viewpoint position, the markers must be laid out to be observed in the image at somewhat narrow intervals.

On the other hand, in order to improve the tracking or identification precision of markers, the markers must be laid out to be observed in the image at somewhat broad intervals.

In case of a single player, it is not so difficult to lay out markers to satisfy the aforementioned conditions. However, in an application which allows a plurality of players to share a common MR space, markers which are laid out at equal intervals at positions that can be observed from a given player cannot often be observed at equal intervals from another player.

For this reason, Japanese Patent Laid-Open No. 11-84307 has proposed an arrangement in which in an air hockey game system in which two players hit and return a virtual puck toward each other on a table as a real object, markers having different colors in units of players are provided to allow the individual players to observe the markers with a preferred layout and size.

However, marker layout using different colors becomes harder with increasing number of players who share a single MR space. More specifically, in order to detect a given color by an image process, the colors of the markers and background object, and those of markers in units of users must be easily detected and extracted by the image process. However, when the number of colors used increases, it becomes difficult to satisfy such conditions, and extraction errors and identification errors among markers can occur.

Figure 10:
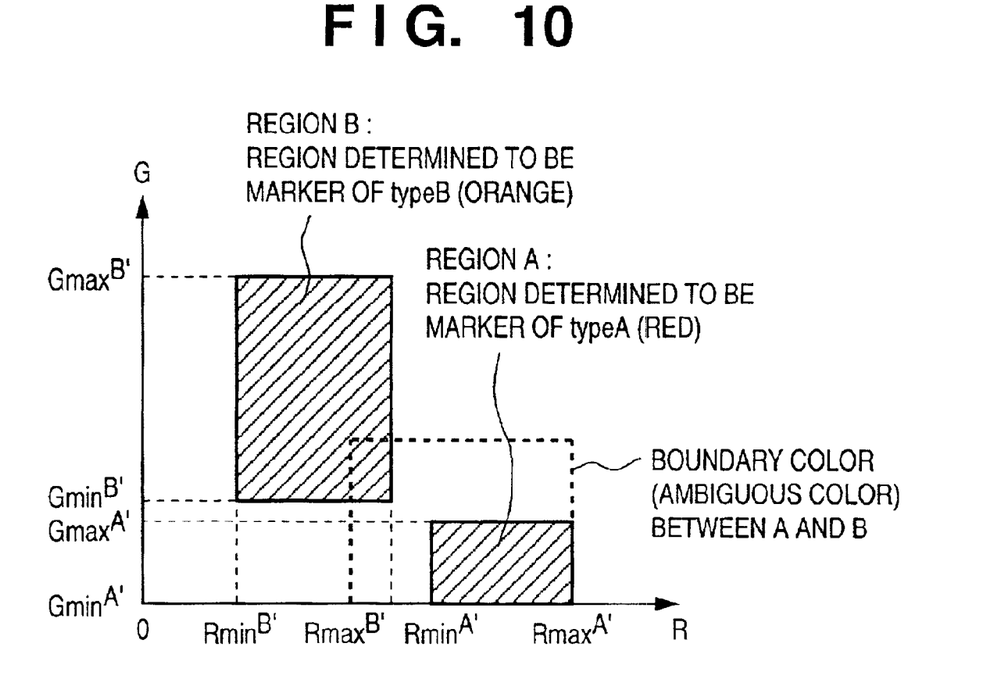
FIG. 10 is a graph for explaining detection errors when the number of colors of markers is increased.

FIG. 10 is a graph for explaining recognition error factors when a plurality of different color markers are used. In FIG. 10, the abscissa plots red, and the ordinate plots green. For the sake of simplicity, a blue axis is not shown. In FIG. 10, region A defines the color distribution of marker type A (red marker), and region B defines the color distribution of marker type B (orange marker). In this manner, when the number of players increases and similar colors are used as markers, even though a player observes a red marker, the marker may be detected as color of region B (i.e., of orange marker), thus causing detection errors.

When a plurality of markers having different colors in units of players are laid out, a very large number of markers appear in the real space, and may complicate the vision of the player, thus impairing reality upon experiencing an MR space.

SUMMARY OF THE INVENTION

It is an object of the present invention to provide a marker layout method in a mixed reality space, which can solve the aforementioned problems, and can reliably detect markers in units of players even when a plurality of players share a common mixed reality space.

It is another object of the present invention to provide a marker layout method in a mixed reality space, which can present the number of markers from simply increasing even when the number of players increases.

It is still another object of the present invention to provide a mixed reality apparatus that exploits the marker layout method in the mixed reality space according to the present invention.

It is still another object of the present invention to provide a mixed reality apparatus and a mixed reality space image generation method, which can solve the aforementioned problems, and allow a player to experience mixed reality without being bothered by the presence of markers.

More specifically, a gist of the present invention lies in a marker layout method for laying out markers in a real space as position indices upon generating a mixed reality space, comprising the step of: laying out the markers to have a positional relationship that allows a given player not to observe markers to be used by only another player when a plurality of players who observe the mixed reality space within different movable ranges observe the mixed reality space.

Another gist of the present invention lies in a mixed reality apparatus for computing and/or correcting location/posture information of a player using markers laid out by a marker layout method of the present invention.

Still another gist of the present invention lies in a storage medium that stores a marker layout method in a mixed reality space according to the present invention as a program which can be executed by a computer.

Still another gist of the present invention lies in a mixed reality apparatus for making a player experience mixed reality by making the player observe a mixed reality space image obtained by mixing real and virtual spaces, markers serving as position indices being laid out in the real space, the apparatus comprising: marker detection means for detecting the markers from image data obtained by sensing the real space from a substantially viewpoint position of the player; and mixed reality space image generation means for generating the mixed reality space image to be observed by the player, so the player observes virtual object images that do not include any images of the markers in surrounding regions (marker regions) including the markers in the image data.

Still another gist of the present invention lies in a mixed reality space image generation method for generating a mixed reality space image which makes a player experience mixed reality by mixing a real space in which markers serving as position indices are laid out, and a virtual space, comprising: the marker detection step of detecting the markers from image data obtained by sensing the real space from a substantially viewpoint position of the player; and the mixed reality space image generation step of generating the mixed reality space image to be observed by the player, so the player observes virtual object images that do not include any images of the markers in surrounding regions (marker regions) including the markers in the image data.

Still another gist of the present invention lies in a storage medium which stores a program that can be executed by a computer, and makes the computer that executes the program function as a mixed reality apparatus of the present invention.

Still another gist of the present invention lies in a storage medium that stores a mixed reality space image generation method according to the present invention as a program which can be executed by a computer.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

A preferred embodiment of a marker layout method according to the present invention will be described hereinafter with reference to the accompanying drawings. In this embodiment, the present invention is applied to an MR game played by three players while sharing a single virtual space, but a marker layout method in an MR space according to the present invention can be applied to any other arbitrary applications.

Figure 1:
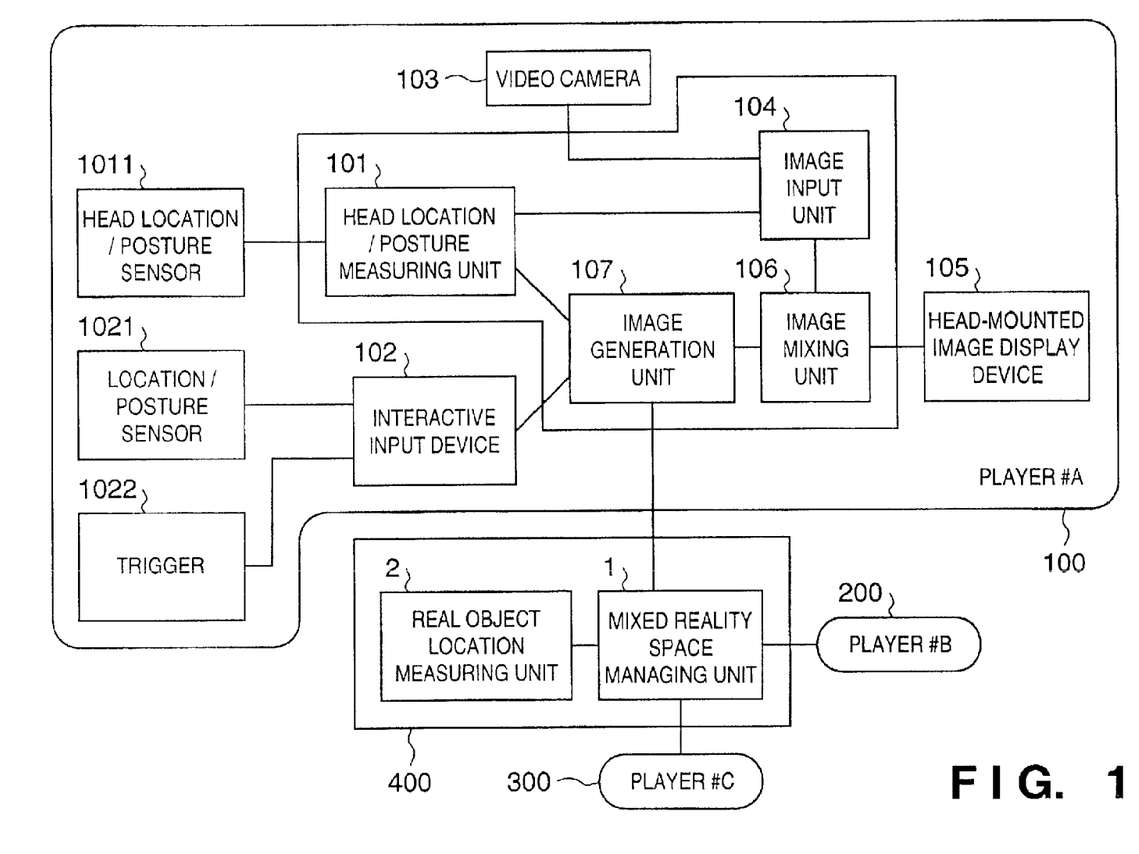
FIG. 1 is a block diagram showing an example of the arrangement of an MR apparatus to which a marker layout method according to the present invention can be applied.

FIG. 1 shows the arrangement of an MR apparatus for implementing an MR game to which a marker layout method of the present invention is applied. FIG. 1 shows the arrangement for three players. The MR apparatus comprises player processors 100 to 300 provided in units of players, and a controller 400 connected to the player processors. The number of player processors connected to the controller 400 increases with increasing number of players.

The player processors 100 to 300 have an identical arrangement. That is, each player processor comprises I/O blocks (102, 103, 105, 1011, 1021, 1022) such as sensors, display device, and the like attached to the player's body, and circuit blocks (101, 104, 106, 107) for processing signals captured by the sensors, and generating an image to be displayed on the display device on the basis of the signal processing results and information of other players supplied from the controller.

The arrangement of the player processor will be explained below with reference to FIG. 1 and FIG. 2 that shows the types and locations of I/O devices each player wears in this embodiment.

Figure 2:
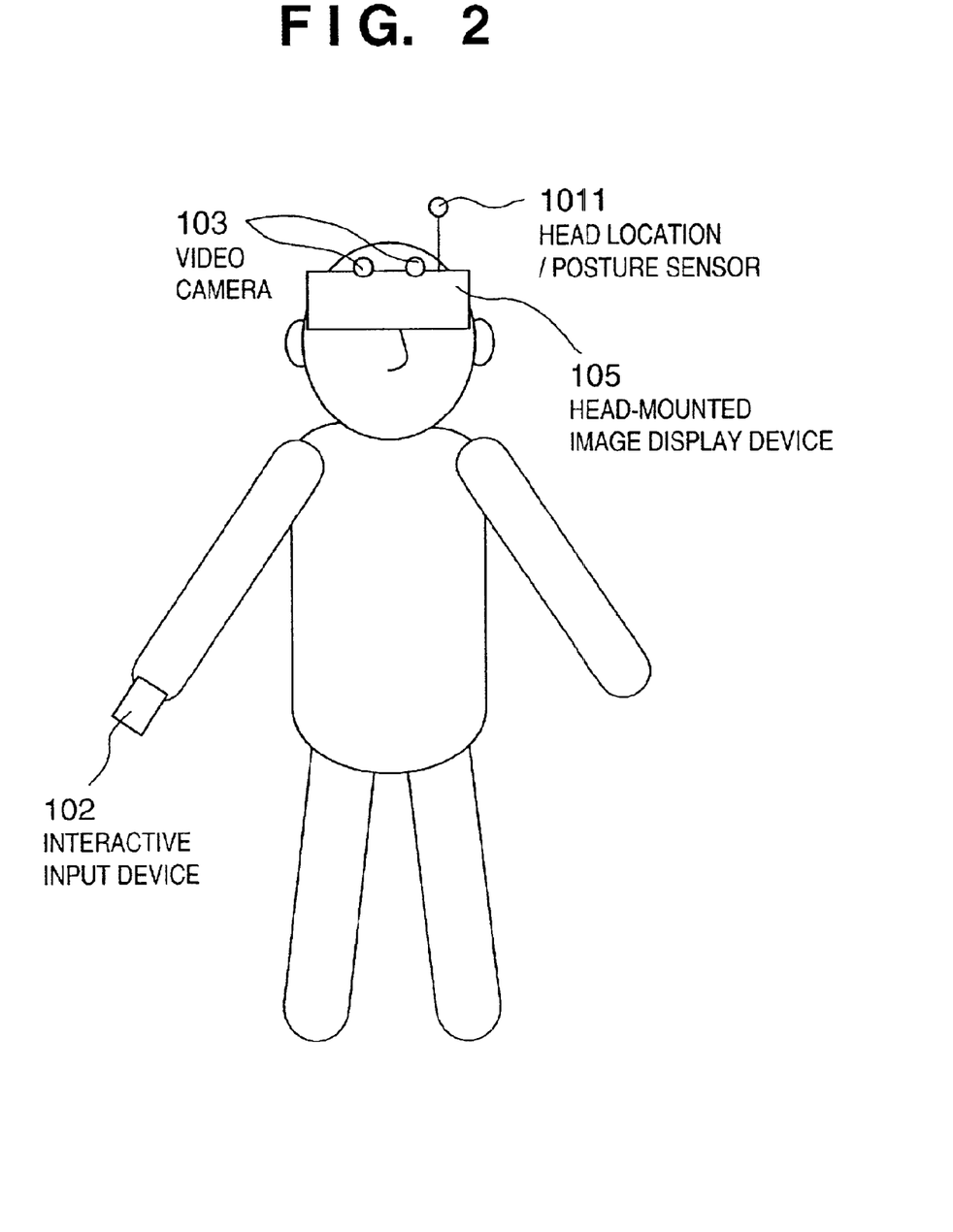
FIG. 2 is a view for explaining the types and locations of devices the player wears.

As shown in FIG. 2, each player wears on his or her head a head-mounted image display device (to be referred to as an HMD hereinafter) 105 as a display device for mixing and displaying real and virtual spaces. In this embodiment, the HMD can be either a video or optical see-through type. In the following description, a case using the video see-through HMD will be explained.

Two small video cameras 103 are provided to those portions of the HMD 105, that are near player's eyes. Video data sensed by these video cameras at nearly the same viewpoint as that of the player are supplied to an image mixing unit 106 (to be described later) via an image input unit 104, and are displayed on the HMD 105 of the player after being superposed on a virtual space image. The image input unit 104 also supplies the input images to a head location detecting (measuring) unit 101 in addition to the image mixing unit 106.

A head location/posture sensor 1011 comprising, e.g., a magnetic sensor, is also attached to the head of the player. The head location/posture sensor 1011 can be attached using, e.g., the HMD 105. The output signal from the head location/posture sensor 1011 is input to the head location/ posture measuring unit 101. The head location/posture measuring unit 101 detects position correction markers using the image supplied from the image input unit 104, and corrects the signal supplied from the head location/posture sensor 1011, thus estimating the viewpoint position and posture of the player.

On the other hand, an interactive input device 102 is attached to a player's arm. The interactive input device 102 has a location/posture sensor 1021 for detecting the location and posture of a portion where the device 102 is attached, and a switch (trigger) 1022 which is turned on/off in response to the motion of the attached portion and is used by the player to input commands by making predetermined actions.

In the following description, a case will be exemplified below wherein a plurality of players (three players in this embodiment) share an identical MR space, play a game for defeating enemies while ducking away from attacks of enemies appearing in the MR space and competing with other players for the number of enemies he or she shoots down or score until the time or damage by enemy attacks reaches a given level, and can input the following commands using the interactive input device 102.

Command 1 (Sight Command)

A command for displaying a line of sight indicating the sight position in the virtual space. This command is input by locating the wrist above the elbow with the back of the hand facing up.

Command 2 (Shooting Command)

A command for shooting the sight position indicated by the line of sight. This command is input by reciprocally moving the arm (from the elbow to the palm) back and forth at a given acceleration or higher while the line of sight is displayed by the sight command.

Command 3 (Defense Command)

A command for defending against an enemy's attack. This command is input by directing the fingertips upward with the back of the hand facing the enemy.

Command 4 (Reset Command)

A command for re-inputting the sight command after the shooting command is input. This command is input by having the arm hanging down.

More specifically, as routine actions in the game of this embodiment, the player repeats command inputs in a cycle of the sight command→shooting command →reset command→sight command, and inputs the defense command as needed in this cycle.

The command input by the interactive input device 102 is supplied to an image generation unit 107.

The image generation unit 107 transfers the head location/ posture information of the player supplied from the head location/posture measuring unit 101 and command information supplied from the interactive input device 102 to the controller 400. Also, the unit 107 generates a virtual space image to be displayed on the HMD 105 of the corresponding player using the head location/posture information and command information of that player, and the head location/ posture information, command information, and model information of other players, the location, moving direction, and state information of enemy characters, and information of the locations, shapes, and the like of obstacles laid out in the space, which are received from the controller 400, and outputs the generated image to the image mixing unit 106.

The image mixing unit 106 mixes the image (real space image) captured by the video cameras 103 attached at the positions near the view point of the player, and the virtual space image generated by the image generation unit 107, and supplies the mixed image to the HMD 105 of the player.

The controller 400 comprises an MR space managing unit 1 to which the aforementioned player processors 100 to 300 are connected, and a real object location measuring unit 2. The MR space managing unit 1 distributes information that pertains to the head locations and postures of the players, and the locations, postures, and commands of the interactive input devices 102, which are received from the player processors 100 to 300, and executes game processes such as appearance/disappearance control of enemy characters to be displayed in the virtual space, scoring of shooting input by the shooting command, and the like. Information that pertains to the models, locations, moving directions, and states (e.g., defeated or not) of enemy characters are distributed to all the users connected together with each player information.

Figure 3A:
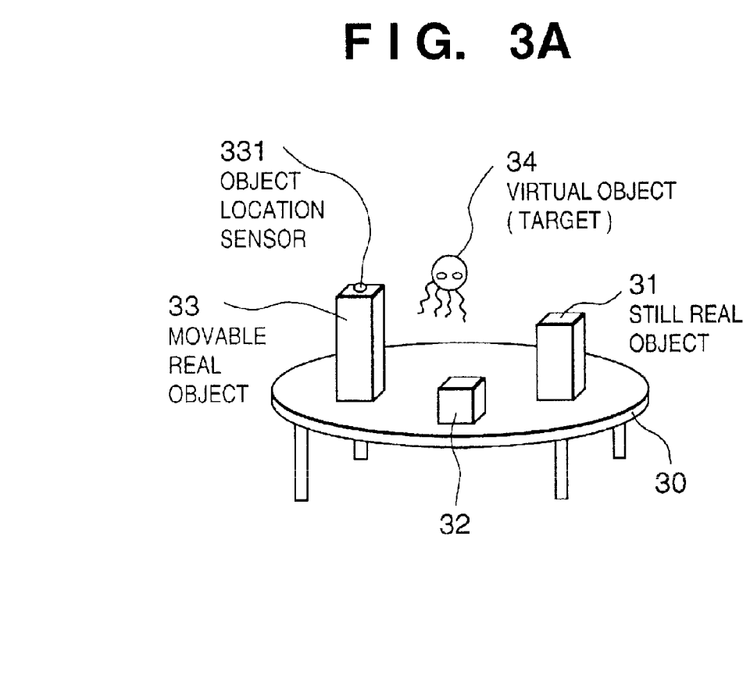
FIGS. 3A and 3B are views for explaining a game in an embodiment of the present invention.
Figure 3B:
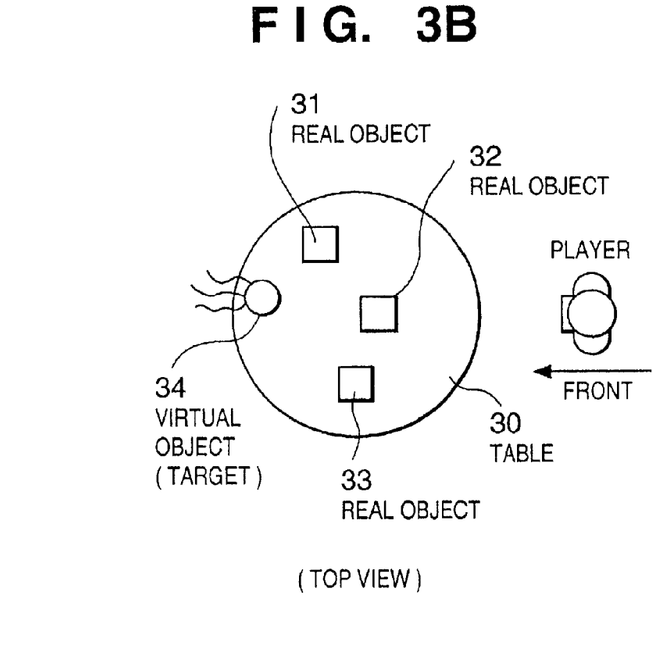

When real objects 31 to 33 are laid out as obstacles to shooting to adjust the game difficulty level, as shown in FIGS. 3A and 3B, the MR space managing unit 1 also manages information that pertains to the shapes and locations of these real objects 31 to 33.

FIG. 3A is a perspective view of a game field (MR space) viewed from a certain player, and FIG. 3B is a top view of the game field. FIGS. 3A and 3B show a case wherein three real space objects 31 to 33 are laid out as obstacles on a table 30 (in the real space). In this embodiment, since the sight command is input by raising the wrist above the elbow using the interactive input device 102, as described above, the real space objects are laid out on the table 30 which is as high as the waist level of a standard body. However, the need for the table can be obviated depending on command input actions using the interactive input device.

In FIGS. 3A and 3B, the real space objects 31 and 32 are fixed in position, and the object 33 is movable. If a movable real space object is provided, the game difficulty level can be dynamically changed. For example, when the movable real object 33 moves to the right and left at a random speed, it is more difficult for a player to shoot an enemy character as a target than a case wherein only the still real objects 31 and 32 are laid out. The movement of the movable real object may be controlled by either the MR space managing unit 1 or another control circuit. In this case, the model of the movable object is managed by the MR space managing unit 1, and its location is obtained by measuring an object location sensor 331 provided to that movable object 33 by the real object location measuring unit 2.

The aforementioned MR apparatus can be implemented by a client-server system which includes the controller 400 as a server, and (the circuit sections of) the player processors 100 to 300 as clients. Since processes that pertain to each player are distributed to and executed by each client, the apparatus can flexibly cope with an increase/decrease in the number of players. More specifically, the player processor can be implemented by a versatile computer having a video I/O function and a signal reception function from various sensors, and the controller 400 can be implemented by a versatile computer having an interface that can communicate with each player processor, and a measurement signal reception function from the object location measuring unit 2.

However, since computations pertaining to three-dimensional image display must be done in real time, a relatively fast computer having an accelerator dedicated to such computations (so-called 3D accelerator) or the like is preferably used. Also, the controller 400 and player processors 100 to 300 are preferably connected via communication lines having a large capacity such as 100BASE-T. If the communication line has a small capacity, the processing speed drops larger with increasing number of players.

Marker Layout Method

Figure 4:
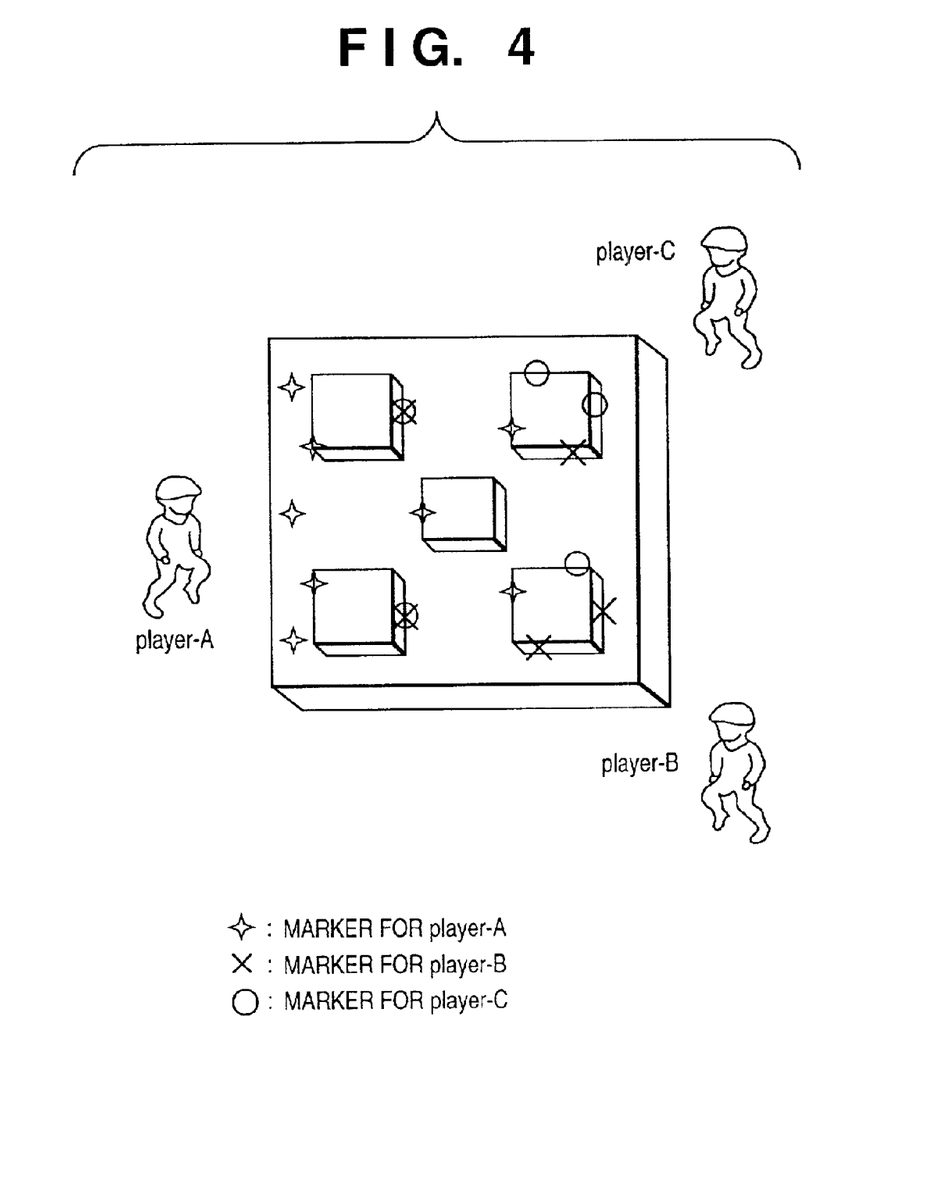
FIG. 4 is a view for explaining a marker layout method according to the present invention.

FIG. 4 is a perspective view showing an example of a marker layout in this embodiment. In the game of this embodiment, real objects serving as obstacles are laid out. By laying out markers using these obstacles, the aforementioned conditions can be satisfied while restricting markers which enter the field of view of each player within the moving range of the player.

Figure 5A:
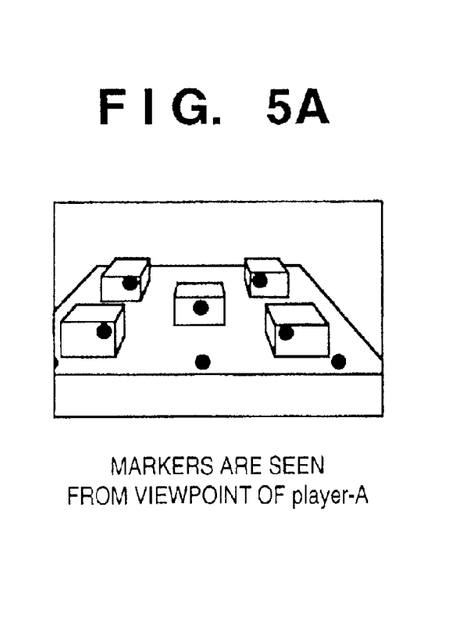
FIGS. 5A to 5C are views showing markers observed from the individual players in the layout shown in FIG. 4.
Figure 5B:
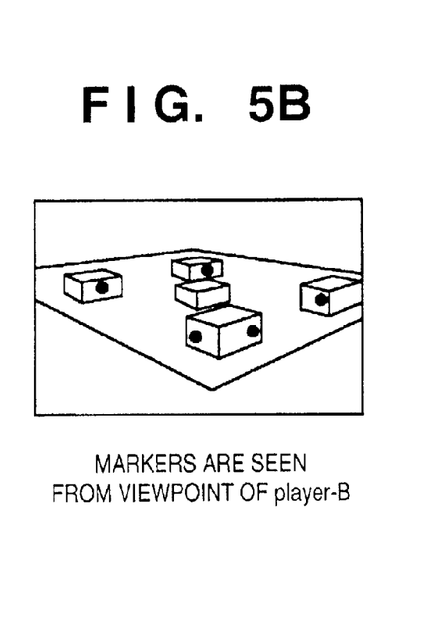
Figure 5C:
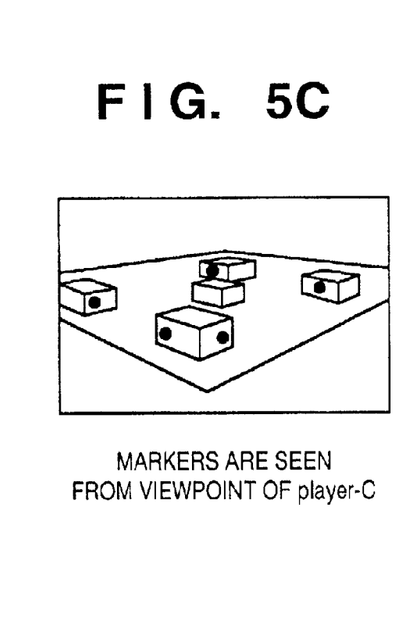

FIGS. 5A to 5C show extracted markers players A, B, and C can respectively see in FIG. 4. In this manner, since each player can observe markers at nearly equal intervals and in a quantity required for computing the viewpoint position, but cannot see markers for other players, the markers need not use different colors. Also, as shown in FIG. 4, a plurality of players can share identical markers.

Figure 6A:
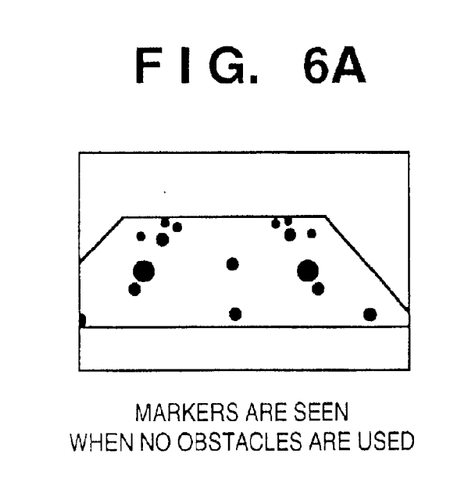
FIGS. 6A to 6C are views showing markers observed from the individual players when markers are laid out in the same layout as in FIG. 4 without using any obstacles.
Figure 6B:
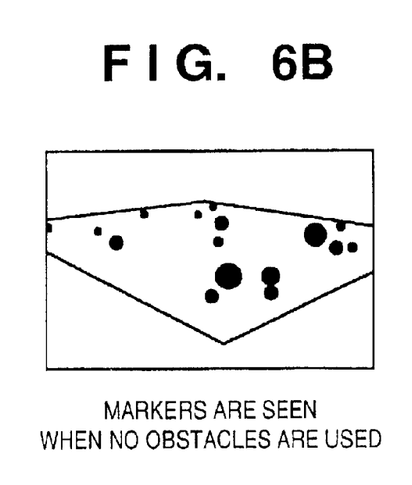
Figure 6C:
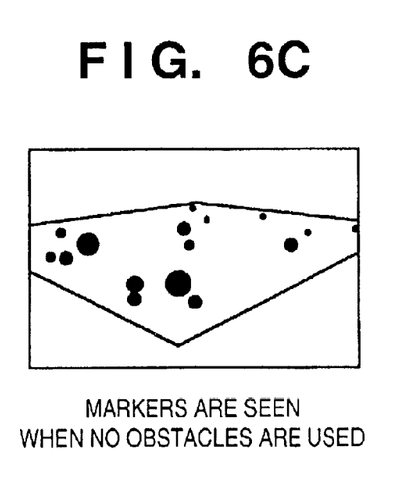

FIGS. 6A to 6C show markers observed by the individual players in correspondence with FIGS. 5A to 5C when no obstacles are used. As can be clearly understood from comparison between FIGS. 5A to 5C and FIGS. 6A to 6C, the marker layout method according to the present invention can make the number of markers each player observes very small, and satisfy the aforementioned conditions.

An increase in the number of players can be coped with by changing the shapes (sectional shapes, heights, and the like) of real objects to which the markers are provided, or adding another color. Even when the number of colors increases, since one color is not assigned per player, markers for a large number of players can be laid out using fewer colors.

The marker layout positions may be determined manually but can be determined by generating real object models and viewpoint position movable range models of the individual players in advance, and obtaining a range in which a given player can see but the lines of sight of other players are intercepted. Furthermore, the marker layout positions may be computed using the number of markers to be provided and layout rules. Conversely, obstacle shapes and/or layout positions that satisfy the aforementioned conditions may be computed.

Even when no objects such as obstacles that can be used to lay out markers are available, real objects may be laid out at positions where no problem is posed in terms of an application, and are hidden by virtual space images, whereby the player can experience an MR space without being bothered by the presence of real objects for markers. Hiding of markers and the like using virtual space images will be explained in detail later.

Detection of Marker

Figure 7:
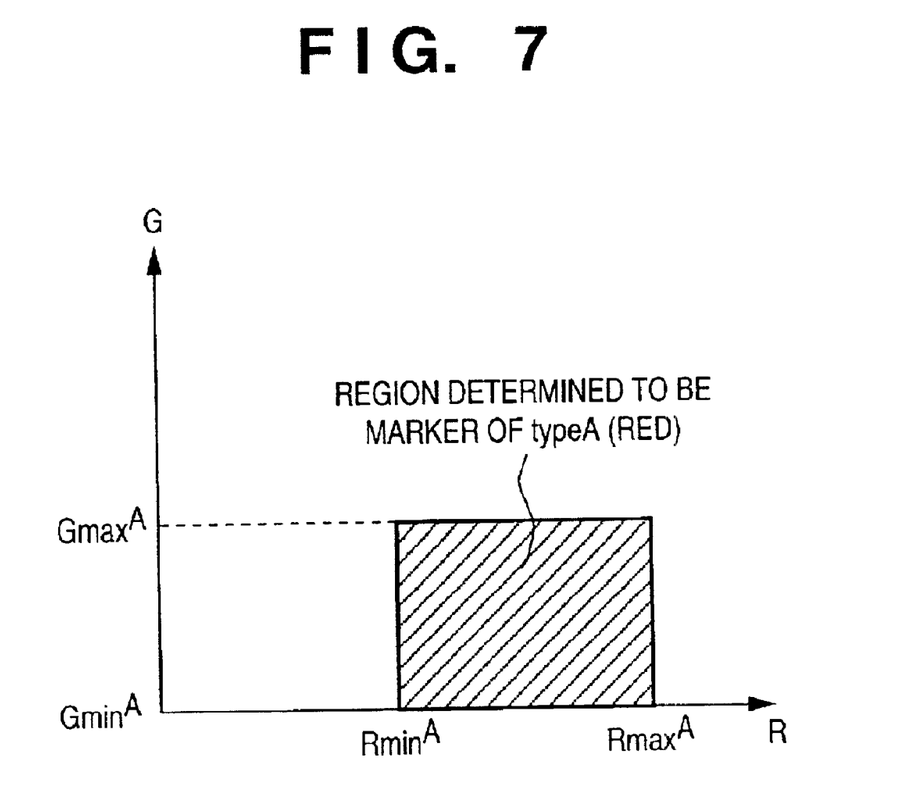
FIG. 7 is a graph showing the color region of a red marker in the embodiment of the present invention.
Figure 8:
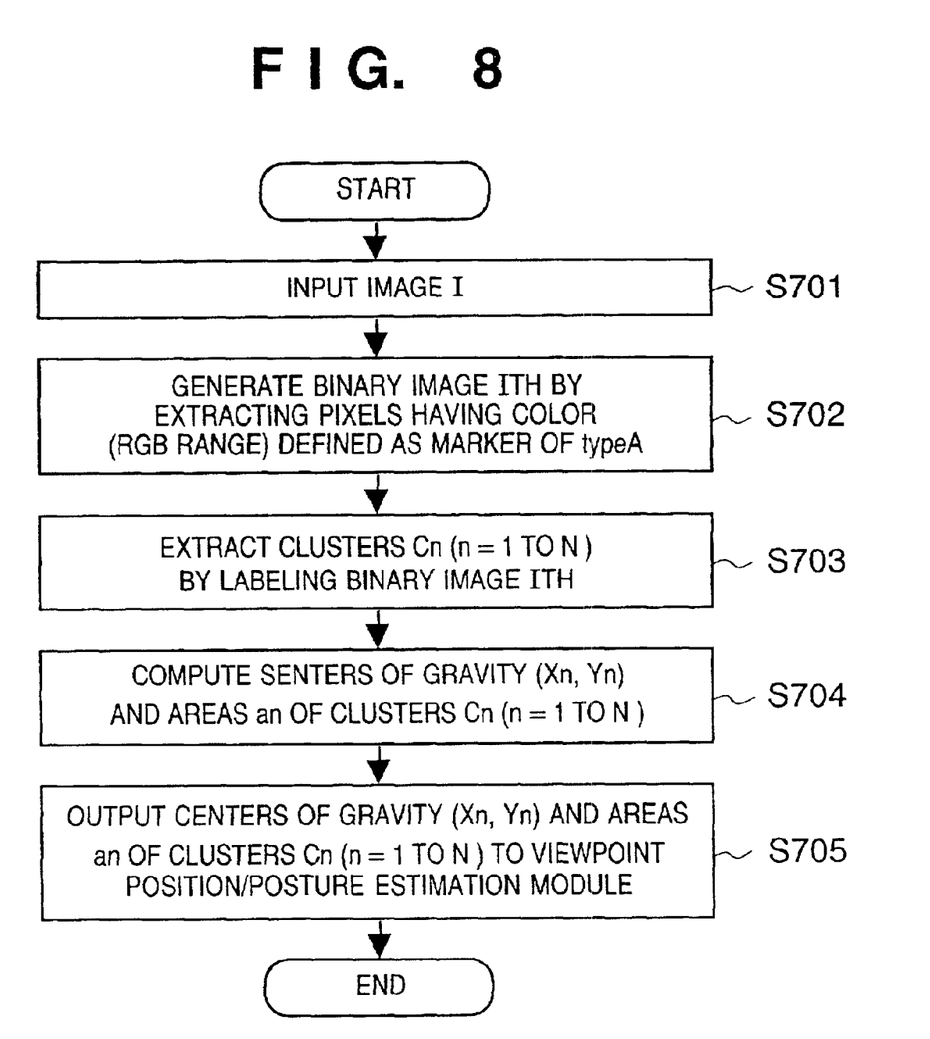
FIG. 8 is a flow chart showing the processing sequence for detecting a marker in the color region shown in FIG. 7 from color image data.

A marker detection method will be explained below. FIG. 8 is a flow chart showing the flow of processing for detecting markers of type A (red markers) having color included in region A shown in FIG. 7. The head location/posture measuring unit 101 executes a marker detection process and uses the detected marker information.

Images sensed by the video cameras 103 are captured via the image input unit 104 (step S701). The captured images are then binarized (step S702). More specifically, let 1 be pixels included in region A shown in FIG. 7 (a blue axis is not shown), and 0 be pixels included in the remaining region. That is, if Ii: i-th pixel that forms input color image I
Ri, Gi, Bi: R, G, and B values that form Ii
ITHi: i-th pixel value of binary image
RminA, GminA, BminA: R, G, and B minimum values that define region A
RmaxA, GmaxA, BmaxA: R, G, and B maximum values that define region A Then, a binary image ITH is formed by setting 1 in ITHi corresponding to Ii that satisfies RminA<Ri<RmaxA, GminA<Gi<GmaxA, and BminA<Bi<BmaxA, and 0 in ITHi corresponding to another Ii in units of Ii.

The binary image ITH undergoes a labeling process to extract marker regions (clusters) (step S703). A center of gravity (Xn, Yn) and area an of each cluster are computed (step S704), and are output to a viewpoint position/posture estimation module (not shown) in the head location/posture measuring unit 101 (step S705). The viewpoint position/posture estimation module corrects the output signal from the head location/posture sensor 1011 on the basis of absolute coordinate positions of markers, which are registered in advance, and the marker positions (centers of gravity of clusters) detected from the image, thus computing the viewpoint position and posture of the player.

In FIG. 8, a process upon detecting markers in a given color (red) has been explained. When the number of players increases and there are a plurality of different color markers, detection processes in units of colors are repeated by changing a threshold value upon generating a binary image.

Deletion of Marker

As described above, markers are not necessary if the output from the head location/posture sensor 1011 is accurate. Furthermore, the presence of markers in an MR space is preferably not recognized since sense of reality may suffer if the player recognizes markers.

For this reason, the present invention is characterized by apparently deleting markers to make the player unconscious of the presence of markers. As a method of apparently deleting markers, various methods may be used. Of these methods, a method of superposing a virtual image on each marker and presenting the virtual image to the player is preferable since it can minimize the processing load and unnatural feeling.

Figure 9A:
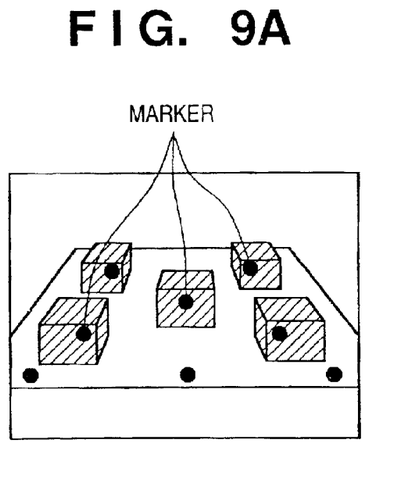
FIGS. 9A to 9C are views for explaining a marker deletion method.
Figure 9B:
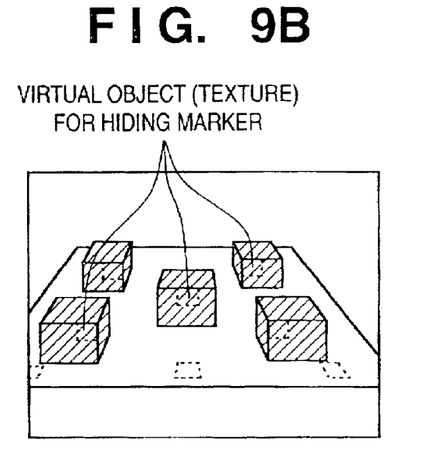

FIGS. 9A to 9C are views for explaining the marker deletion method. FIG. 9A shows markers for player A, which are laid out according to the marker layout method in this embodiment, and corresponds to FIG. 5A. In order to delete markers laid out on real objects such as a table, obstacles, and the like, a prospective layout place is sensed using a video camera, digital camera, still camera, or the like before markers are laid out so as to capture image data as a texture, and the markers are then laid out. The MR space managing unit 1 manages, as virtual objects for hiding the markers, two-dimensional patches each of which has a position, direction, and size to hide each marker, and a texture image corresponding to the marker before marker layout, and distributes them to the player processors 100 to 300. The image generation unit 107 in each play processor renders such patches as parts of a virtual space image using the head location/posture information of the player upon rendering the virtual space image pertaining to the game. As a result, the image mixing unit 106 superposes images before marker layout on regions corresponding to the markers in the real space image (FIG. 9B).

In this manner, by replacing/superposing image data, the player can concentrate on the game without being bothered by the presence of the markers. Image data prepared as texture data are preferably captured under conditions (light source position and brightness) actually used to reduce unnatural feeling of vision. But texture images for deleting markers to be laid out on real objects made of an identical material may use a single common texture. Texture images are not particularly limited as long as they do not make the player feel unnatural. Also, texture images to be laid out for the game may be used to hide the markers, and three-dimensional objects that hide the markers may be laid out as virtual objects in place of two-dimensional patches.

Figure 9C:
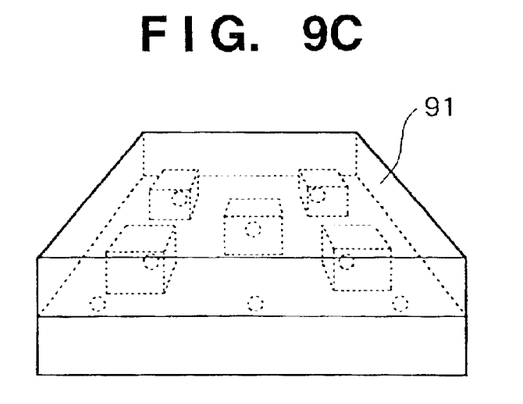

In an application that does not use any obstacles, when real objects are laid out for only the purpose of marker layout, or when it is hard to superpose virtual objects on individual markers, a virtual object 91 that covers all real objects may be used, as shown in FIG. 9C. In such case, a virtual object to be used can be appropriately determined depending on applications. For example, in a game application, a stage or something like that in a virtual space may be formed using the virtual object 91. Or in an application in which the user is preferably unaware of any difference from a real space, object data sensed in the real space may be used.

Other Embodiments

In the above embodiment, information obtained from the markers is used to correct errors of the head location/posture sensor 1011. Alternatively, the viewpoint position and posture of the player may be computed from only the information obtained from the markers without using the head location/posture sensor 1011, and the present invention can be used in such application.

The above embodiment has exemplified a video see-through MR apparatus, but the present invention can be similarly applied to an optical see-through MR apparatus.

In the above embodiment, single-color markers are used, but any other visible features may be used. For example, a plurality of different colors may be used, or features other than color may be used. Also, specific textures, shapes, or the like may be used, and these features may be combined.

The objects of the present invention are also achieved by supplying a storage medium (or recording medium), which records a program code of a software program that can implement the functions of the above-mentioned embodiments to a system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To restate, according to the present invention, markers which are used in an alignment process in an MR apparatus can be laid out while satisfying required positional and numerical conditions, even when a plurality of players share a single MR space.

Since the marker color need not be changed for each player, probability of occurrence of detection errors can be reduced even when the number of players increases.

Furthermore, since real space objects which are laid out originally can be used, no extra objects used to lay out markers are required depending on applications.

As many apparently widely different embodiments of the present invention can be made without departing from the spirit and scope thereof, it is to be understood that the invention is not limited to the specific embodiments thereof except as defined in the appended claims.

What is claimed is:

1. A mixed reality space image generation method for generating a mixed reality space image which makes a player experience mixed reality by mixing a real space in which markers serving as position indices are laid out, and a virtual space, comprising:

a marker detection step of detecting the markers from image data obtained by sensing the real space from a substantially viewpoint position of the player;

a correcting step of correcting location/orientation information of the player based on the markers detected by said marker detection step; and a mixed reality space image generation step of generating a mixed reality space image to be observed by the player, so the player observes virtual object images that do not include any images of the markers in surrounding regions (marker regions) including the markers in the image data;

wherein the mixed reality space image generation step includes a step of substituting or overlaying images of the marker regions by predetermined virtual object images.

2. A mixed reality space image generation method for generating a mixed reality space image which makes a player experience mixed reality by mixing a real space in which markers serving as position indices are laid out, and a virtual space, comprising:

a marker detection step of detecting the markers from image data obtained by sensing the real space from a substantially viewpoint position of the player;

a correcting step of correcting location/orientation information of the player based on the markers detected by the marker detection step; and a mixed reality space image generation step of generating a mixed reality space image to be observed by the player, so the player observes virtual object images that do not include any images of the markers in surrounding regions (marker regions) including the markers from the image data, wherein the mixed reality space image generation step includes a step of substituting or overlaying an image of a region including all the markers in the image data by a predetermined virtual object image.

3. The method according to claim 1, wherein the predetermined virtual objects are images of plane patches with the same or similar texture, size, location and orientation of the marker regions before the markers are laid out.

4. A computer readable storage medium that stores a program which can be executed by a computer, making the computer which executes the program function as:

marker detection means for detecting the markers from image data obtained by sensing the real space from a substantially viewpoint position of the player;

correcting means for correcting location/orientation information of the player based on the markers detected by the marker detection means; and mixed reality space image generation means for generating a mixed reality space image to be observed by the player, so the player observes virtual object images that do not include any images of the markers in surrounding regions (marker regions) including the markers in the image data;

wherein the mixed reality space image generation means includes means for substituting or overlaying images of the marker regions by predetermined virtual object images.

5. A computer readable storage medium that stores a program which can be executed by a computer, said program making the computer which executes the program function as:

a mixed reality apparatus for making a player experience mixed reality by making the player observe a mixed reality space image obtained by mixing a real space in which markers serving as position indices are laid out, and a virtual space, comprising:

marker detection means for detecting the markers from image data obtained by sensing the real space from a substantially viewpoint position of the player;

correcting means correcting location/orientation information of the player based on the markers detected by the marker detection means; and mixed reality space image generation means for generating a mixed reality space image to be observed by the player, so the player observes virtual object images that do not include any images of the markers in surrounding regions (marker regions) including the markers in the image data;

wherein the mixed reality space image generation means includes means for substituting or overlaying an image of a region including all the markers in the image data by a predetermined virtual object image.

6. A mixed reality apparatus for providing a mixed reality space shared by a plurality of players, comprising:

an input unit adapted to input a real space image representing the real space;

a marker detecting unit adapted to extract pixels having a color that is predefined as a marker from the real space image, perform a labeling process to detect marker regions, and detect positions of markers from the marker regions;

a head location/orientation estimation unit to estimate a location/orientation of a viewpoint of a player by using the detected marker positions;

a mixed reality space image generation unit adapted to generate a virtual space image to be observed by the player based on the location/orientation of the viewpoint of the player and model information; and an image combining unit adapted to generate a mixed reality space image by combining the real space image with the virtual space image, wherein the markers are laid out in the real space so that the markers to be used by only the given player are laid out at positions hidden by real objects when the markers are observed from the other player.

7. A method for providing a mixed reality space shared by a plurality of players, comprising:

an input step of inputting a real space image representing the real space;

a marker detecting step of extracting pixels having a color that is predefined as a marker from the real space image, performing a labeling process to detect marker regions, and detecting positions of markers from the marker regions;

a head location/orientation estimation step of estimating a location/orientation of a viewpoint of a player by using the detected marker positions;

a mixed reality space image generation step of generating a virtual space image to be observed by the player based on the location/orientation of the viewpoint of the player and model information; and an image combining step of generating a mixed reality space image by combining the real space image with the virtual space image;

wherein the markers are laid out in the real space so that the markers to be used by only a given player are laid out at positions hidden by real objects when the markers are observed from the other player.

8. A mixed reality apparatus having an image generating unit adapted to generate a virtual space image corresponding to a viewpoint position and orientation of a player, an input unit adapted to input a real space image obtained by sensing from a substantially viewpoint position of the player and an image combining unit adapted to generate a mixed reality space image by combining the real space image with the virtual space image, comprising:

a marker detection unit adapted to detect marker regions for the real space image input from said input unit and obtained by sensing the real space in which markers serving as position indices are laid out;

a correction unit adapted to correct location/orientation information of the player based on the marker regions detected by said marker detection unit;

a location/orientation estimation unit adapted to estimate a location/orientation of a viewpoint of a given player using the detected marker regions;

a storing unit adapted to store a real space image obtained by sensing the real space before the markers are laid out as a texture image; and a replacing unit adapted to replace said marker regions in the real space image with corresponding regions in said texture image or superimpose said corresponding regions in said texture image on said marker regions in the real space image.

9. A mixed reality image generating method including an image generating step of generating a virtual image corresponding to a viewpoint position and orientation of a player, an input step of inputting a real space image obtained by sensing from a substantially viewpoint position of the player and an image combining step of generating a mixed reality space image by combining the real space image with the virtual space image, comprising:

a marker detection step of detecting marker regions for the real space image obtained by sensing the real space in which markers serving as position indices are laid out;

a correction step of correcting location/orientation information of the player based on the marker regions detected by said marker detection step;

a storing step of storing a real space image obtained by sensing the real space before the markers are laid out as a texture image; and a replacing step of replacing said marker regions in the real space image with corresponding regions in said texture or superimposing said corresponding regions in said texture image on said marker regions in the real space image.

10. The mixed reality generating method according to claim 9, wherein the same texture image is used for replace or superimpose the marker regions corresponding to markers laid out on real objects made of an identical material.

11. The mixed reality image generating method according to claim 9 further comprising:
   a location/orientation estimation step of estimating a location/orientation of a viewpoint of the player using the detected marker regions, the location information of the detected markers and output signal from a position/orientation sensor mounted on the player's head.

12. A computer-readable storage medium that stores program code for controlling an apparatus to perform a mixed reality generating method, wherein the generating method includes an image generating step of generating a virtual image corresponding to a viewpoint position and orientation of a player, an input step of inputting a real space image obtained by sensing from substantially a viewpoint position of the player and an image combining step of generating a mixed reality space image by combining the real space image with the virtual space image, said storage medium comprising program code for controlling the apparatus to perform:
   a marker detection step of detecting marker regions for the real space image obtained by sensing the real space in which markers serving as position indices are laid out;
   a correction step of correcting location/orientation information of the player based on the marker regions detected by said marker detection step;
   a storing step of storing a real space image obtained by sensing the real space before the markers are laid out as a texture image; and
   a replacing step of replacing said marker regions in the real space image with corresponding regions in said texture or superimposing said corresponding regions in said texture image on said marker regions in the real space image.

* * * * *

UNITED STATES PATENT AND TRADEMARK OFFICE
CERTIFICATE OF CORRECTION

PATENT NO. : 7,084,887 B1 Page 1 of 1
APPLICATION NO. : 09/506382
DATED : August 1, 2006
INVENTOR(S) : Kiyohide Sato et al.

It is certified that error appears in the above-identified patent and that said Letters Patent is hereby corrected as shown below:

ON THE TITLE PAGE, AT ITEM (*), NOTICE:
Insert --This patent issued on a continued prosecution application filed under 37 CFR 1.53(d), and is subject to the twenty year patent term provisions of 35 U.S.C. 154(a)(2).--

COLUMN 1:
Line 52, "detect" should read --detect them--.

COLUMN 8:
Line 24, "upon" should read --for--.

COLUMN 12:
Delete lines 33 to 35.

COLUMN 13:
Line 2, "for" should read --to--.

Signed and Sealed this

Twenty-first Day of October, 2008

JON W. DUDAS
*Director of the United States Patent and Trademark Office*